(12) United States Patent
Kanefsky (10) Patent No.: US 8,560,562 B2
(45) Date of Patent: Oct. 15, 2013

(54) PREDICTIVE QUERY SUGGESTION CACHING

(75) Inventor: Steven T. Kanefsky, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 404 days.

(21) Appl. No.: 12/841,571

(22) Filed: Jul. 22, 2010

(65) Prior Publication Data
US 2012/0023120 A1 Jan. 26, 2012

(51) Int. Cl.
*G06F 17/30* (2006.01)

(52) U.S. Cl.
USPC .......................................... 707/767

(58) Field of Classification Search
USPC ......... 707/705–707, 721, 759, 765, 766–769, 707/999.001–999.003
See application file for complete search history.

(56) References Cited

U.S. PATENT DOCUMENTS

| | | | |
|---|---|---|---|
| 8,126,946 B2* | 2/2012 | Hughes et al. | 707/706 |
| 2004/0186827 A1* | 9/2004 | Anick et al. | 707/3 |
| 2005/0055341 A1* | 3/2005 | Haahr et al. | 707/3 |
| 2005/0283468 A1* | 12/2005 | Kamvar et al. | 707/3 |
| 2006/0059135 A1* | 3/2006 | Palmon et al. | 707/3 |
| 2006/0253427 A1* | 11/2006 | Wu et al. | 707/3 |
| 2006/0288000 A1* | 12/2006 | Gupta | 707/5 |
| 2009/0043741 A1* | 2/2009 | Kim | 707/3 |
| 2010/0076994 A1* | 3/2010 | Soroca et al. | 707/769 |
| 2010/0106854 A1* | 4/2010 | Kim et al. | 709/238 |
| 2010/0185644 A1* | 7/2010 | Gutt et al. | 707/759 |
| 2010/0228710 A1* | 9/2010 | Imig et al. | 707/706 |
| 2011/0072033 A1* | 3/2011 | White et al. | 707/768 |

FOREIGN PATENT DOCUMENTS

WO  WO2007078768 A1  7/2007

OTHER PUBLICATIONS

PCT Notification of Transmittal of the International Search Report and the Written Opinion of the ISA, PCT/US2011/044496, Jul. 23, 2012, 11 pages.
'Autocomplete.' Google Inside Search, Web Search [online]. [retrieved on Oct. 24, 2012]. Retrieved from Internet electronic mail at http://support.google.com/websearch/bin/answer.py?hl=en&answer=106230, 3 pages.

* cited by examiner

*Primary Examiner* — Robert Timblin
(74) *Attorney, Agent, or Firm* — Fish & Richardson P.C.

(57) ABSTRACT

Methods, systems, an apparatus, and computer program products, for pre-caching query suggestions. In one aspect, a method includes receiving from a client device a request for a search resource; providing to the client device in response to the request the search resource, the search resource including: first instructions that cause the client device to generate a search interface that includes a first query input field; initial query suggestions; second instructions that cause the client device to: store the initial query suggestions in a suggestion store on the client device; compare query characters input in the first query input field to the query suggestions stored in the suggestion store; select query suggestions that match the query characters input in the first query input field based on the comparison; and display the selected query suggestions as query suggestions for the query characters input into the first query input field.

22 Claims, 5 Drawing Sheets

PREDICTIVE QUERY SUGGESTION CACHING

BACKGROUND

This specification relates to query suggestions.

The Internet provides access to a wide variety of resources. Example resources include video files, image files, audio files, or Web pages including content for particular subjects, book articles, or news articles. A search system can select one or more resources in response to receiving a search query. A search query is data that a user submits to a search engine to satisfy the user's informational needs. The search system selects and scores resources based on their relevance to the search query and on their importance relative to other resources to provide search results that link to the selected resources. The search results are typically ordered according to the scores, and provided in a search results page.

Search systems can provide search suggestions to users to help users satisfy their informational needs. As used herein, the term "query suggestion" is suggested data that can be used to refine a search or refine a search strategy. A query suggestion can be another search query, keywords, or topics to which a search query or keyword belongs. A query suggestion is often used as an additional query, e.g., the query suggestion can be processed by the search system as a query in response to a user selection of the query suggestion.

Some search systems provide query suggestions as the user is typing so that the user can select a query suggestion without requiring typing the entire query. These systems typically send suggestion requests to a search engine with each keystroke, and the search engine provides query suggestions with prefixes that match the entered characters. This suggestion service is also offered on mobile devices. However, mobile devices often need to deal with much higher network latency, and the performance of the suggestion service can degrade as latency increases. Often the latency may be such that the suggestions received do not match the current query prefix entered, which tends to degrade the user experience rather than improve it.

SUMMARY

In general, one innovative aspect of the subject matter described in this specification can be embodied in methods that include the actions of receiving from a client device a request for a search resource; providing to the client device in response to the request the search resource, the search resource including: first instructions that cause the client device to generate a search interface that includes a first query input field, initial query suggestions, and second instructions that cause the client device to: store the initial query suggestions in a suggestion store on the client device, compare query characters input in the first query input field to the query suggestions stored in the suggestion store, select query suggestions that match the query characters input in the first query input field based on the comparison; and display the selected query suggestions as query suggestions for the query characters input into the first query input field. Other embodiments of this aspect include corresponding systems, apparatus, and computer programs, configured to perform the actions of the methods, encoded on computer storage devices.

In general, another aspect of the subject matter described in this specification can be embodied in methods that include the actions of providing a request for a search resource from a search engine; receiving the search resource in response to the request the search resource, the search resource including: first instructions that cause the client device to generate a search interface that includes a first query input field, initial query suggestions, and second instructions that cause the client device to: store the initial query suggestions in a suggestion store on the client device, compare query characters input in the first query input field to the query suggestions stored in the suggestion store, select query suggestions that match the query characters input in the first query input field based on the comparison; and display the selected query suggestions as query suggestions for the query characters input into the first query input field. Other embodiments of this aspect include corresponding systems, apparatus, and computer programs, configured to perform the actions of the methods, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Figure 1:
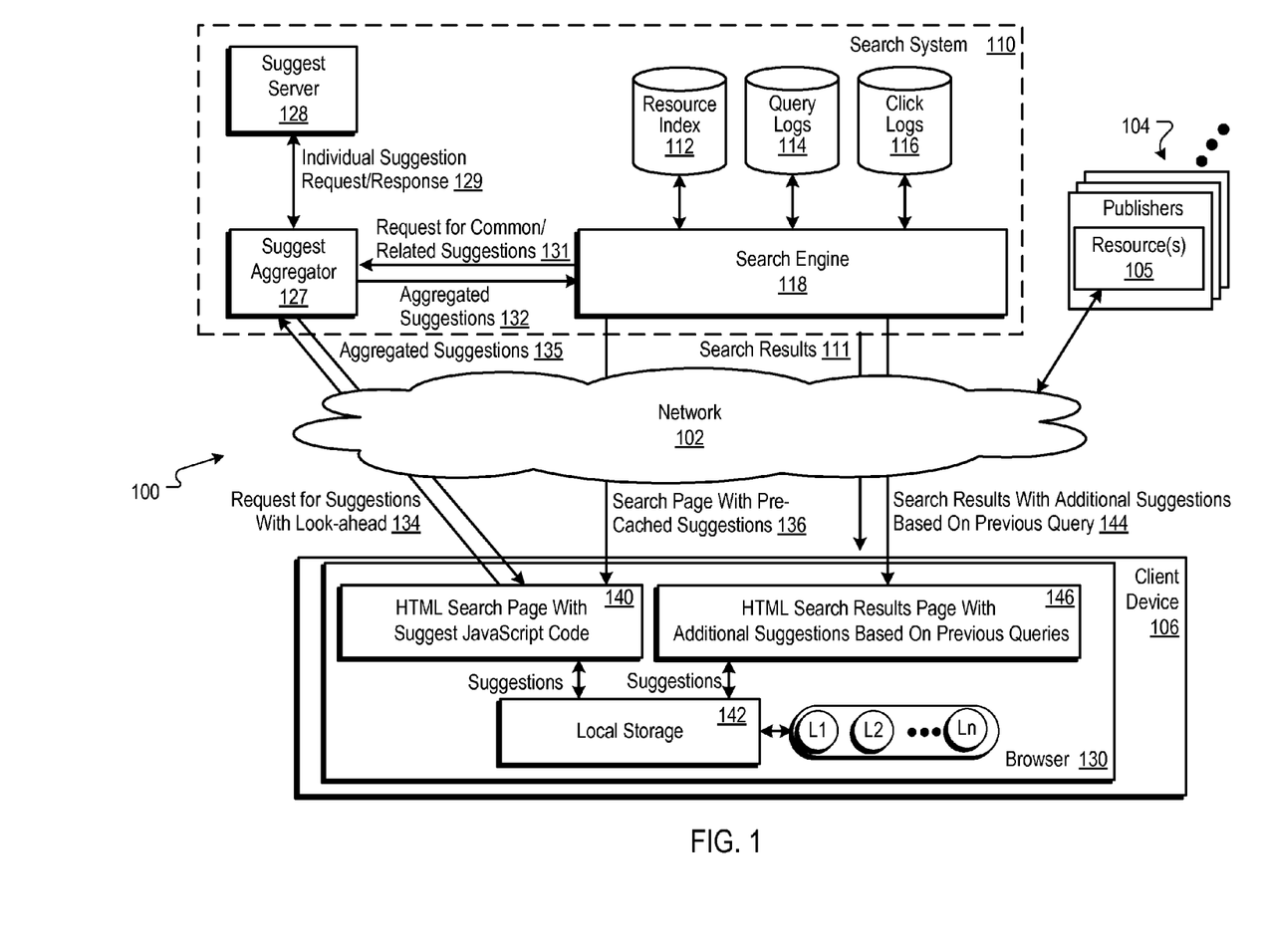
FIG. 1 is a block diagram of a query suggestion system in data communication with a client device.

FIG. 1 is a block diagram of a query suggestion system 100 in data communication with a client device 106. A computer network 102, such as a local area network (LAN), a wide area network (WAN), the Internet, or a combination thereof, connects publishers 104, the client device 106, and a search system 110.

A publisher 104 is any web site that hosts and provides electronic access to a resource by use of the network 102. A web site can be a collection of one or more resources 105 associated with a domain name. An example web site is a collection of web pages formatted in hypertext markup language (HTML) that can contain text, graphic images, multimedia content, and programming elements, such as scripts.

A resource is any data that can be provided by the publisher 104 over the network 102 and that is addressed by a resource address. Resources include HTML pages, word processing documents, portable document format (PDF) documents, images, video, and feed sources, to name just a few. The resources may include content, such as words, phrases, pictures, and so on, and may include embedded information, such as meta (or metadata) information and hyperlinks and/or embedded instructions (such as JavaScript scripts).

Each resource has an addressable storage location that can be uniquely identified. The addressable location is addressed by a resource locator, such as a universal resource locator (URL).

A client device 106 is an electronic device that is under control of a user and is capable of requesting and receiving resources over the network 102. Example client devices 106 include personal computers, laptop computers, mobile communication devices, and other devices that can send and receive data over the network 102. A client device 106 typically includes a user application, such as a web browser, to facilitate the sending and receiving of data over the network 102.

The search system 110 includes a search engine 118 for searching resources. As there are many thousands of publishers, there are millions of resources available over the network 102. To facilitate searching of these resources, the search engine 118 identifies the resources by crawling the publishers 104 and indexing the resources 105 provided by the publishers 104. The indexed and, optionally, cached copies of the resources 105 are stored in a resource index 112. In general, the resource index 112 can include various types of indexes for resources 105, including keyword-based indexes, location-based indexes, and other indexes.

The client device 106 submits search queries to the search engine 118. In response, the search engine 118 uses the resource index 112 to identify resources that are relevant to the queries. The search engine 118 identifies resources, generates search results that identify the resources, and returns the search results to the client device 106. A search result 111 identifies a resource that is responsive to the query and includes a resource locator for the resource. An example search result 111 can include a web page title, a snippet (or portion) of text extracted from the web page, and the URL of the web page.

The search results are ranked based on scores related to the resources 105 identified by the search results, such as information retrieval ("IR") scores, and optionally, a quality score of each resource relative to other resources. In some implementations, the IR scores are computed from dot products of feature vectors corresponding to a search query and a resource 105, and the ranking of the search results is based on initial relevance scores that are a combination of the IR scores and the quality scores. The search results are ordered according to these initial relevance scores and provided to the client device 106 according to the order.

The client device 106 receives the search results pages and renders the pages for presentation to users, such as in the users' browsers. In response to a user selecting a search result at the client device 106, the resource 105 that the search result 111 references is provided to the requesting client device 106.

The queries submitted from client devices are stored in query logs 114. Click data for the queries and the web pages referenced by the search results are stored in click logs 116. The click data define actions taken responsive to search results provided by the search engine 118. The query logs 114 and click logs 116 can be used to map queries submitted by the client devices to web pages that were identified in search results and the actions taken by users (i.e., data that are associated with the identifiers from the search requests so that a search history for each identifier can be accessed). If time data are also stored, then the relative times at which those actions were taken and when the queries were submitted can also be determined. The click logs 116 and query logs 114 can thus be used by the search engine to track the sequence of queries submitted by the client devices, the actions taken (e.g., by the user) in response to the queries, and how often the queries are submitted.

In some implementations, the search system 110 can determine and provide query suggestions while the user is typing in a query. As an example, the user of the client device 106 can be entering a query that begins "new y . . . " The search system 110 can provide suggested query completions, or suggestions, such as "new york," "new york city," "new york times," and so on. The suggestions can appear, for example, in a suggestions box within the user's web browser, such as adjacent to the search box in which the user has begun typing the query. If the suggestions box contains the query that the user intended and is recognized as such by the user, the user can select (e.g., click on) the suggestion, and the suggestion can replace the user's partial query in the search box. As a result, the user need not enter the entire query.

This process of query suggestions can operate well on a user's personal computer or other computing device that has network bandwidth to handle query suggestions relatively quickly. However, some mobile communication devices, such as mobile phones and smart phones, may have a higher network latency as compared to the latency of a wired connection to a desktop PC. As a result, the suggestion process can be so slow that it interferes with the process of the user typing in a query. One reason for this is when suggestions arrive after the user has typed additional keystrokes, the delay can have the effect of making some suggestions inapplicable to the currently-entered query.

To overcome network latency inherent to some computing device connections (e.g., mobile communication device connections), the search system 110 can predict suggestions well before they may otherwise be predictable from partially-entered queries alone. For example, the search system 110 can use a user's query history in order to begin determining likely suggestions well before the user's client device 106 would display them. Suggestions provided by the search system 110 can be provided to the client device 106, which then can use caching and local storage to make the suggestions available on the client device 106 before they are needed.

Referring again to FIG. 1, the search system 110 includes a suggest aggregator 127 and a suggest server 128. The suggest aggregator 127 is a server-side code module that can generate aggregated sets of selections for partial queries based on what the user has typed or is most likely to type. The suggest server 128 is a server-side code module that can provide complete suggested queries for one specific partial query. The suggest aggregator 127 and the suggest server 128 can communicate using an individual suggestion request/response interface 129. For example, the suggest aggregator 127 can send a request (e.g., a partial query) to the suggest server 128, and in response, the suggest server 128 can return a corresponding response (e.g., suggestions that match the partial query). In some implementations, the suggest aggregator 127 and the suggest server 128 can be combined into a single component.

The suggest aggregator 127 also communicates with the search engine 118. For example, based on queries that the search engine 118 receives (e.g., from a user's browser 130), the search engine 118 can send a request for common/related suggestions 131 to the suggest aggregator 127. In response, the suggest aggregator 127 can identify suggestions (e.g., by interfacing with the suggest server 128) and send aggregated suggestions 132 to the search engine 118. As a result, pre-cached suggestions can be included in the search pages that the search engine 118 provides to the client device 106 for use in the browser 130. Working together, the search engine 118, the suggest aggregator 127 and the suggest server 128 provide the server-side processing used for generating suggestions within the system 100.

As an example of partial queries and the suggestions that result, a typical flow can be as follows. A user executing the browser 130 on the client device 106 can request an HTML search page. The user may be using the browser 130 for the first time (e.g., on a brand new mobile communication device), or the user may have browsed several times before on his client device 106 and is simply starting a new browsing session. The search page that is provided includes, in some implementations, initial query suggestions. For example, the suggestions can be based on past queries of all users, using information stored in the query logs 114. Using these suggestions, the search system 110 can provide a search page with pre-cached suggestions 136 to the user's browser 130 even before the user begins entering a query.

The client device 106 receives the search page with pre-cached suggestions 136. In addition to the normal HTML code of the search page, the search page includes additional instructions, e.g., JavaScript code 140, that is able to manage search history and a cache of many partial queries and associated suggestions. The search page also includes a set of the most likely suggestions based on the first few characters that the user is likely to type in his query. Suggestions received from the search system 110 are stored in local storage 142 within the browser 130.

As the user types characters (e.g., "ne") into the search field within the browser 130, the suggestion cache in local storage 142 is checked to see if it contains the partial query. If so, then the suggestions for that partial query can be displayed immediately to the user in the browser 130. In some implementations, a request (e.g., a request for suggestions with look-ahead 134) is also sent to the suggest aggregator 127 to get aggregated suggestions 135 for additional partial queries based on what the user has typed so far and is most likely to type next. In this way, the system 100 can frequently stay ahead of the user and have suggestions available for any partial query before the user has typed it. The performance can improve over time as the cache grows, particularly since many users tend to execute similar (or even identical) queries over time.

Although the communications may experience high latency, the presences of the pre-cached suggestions allows for the generation of query suggestions even if additional suggestions are not timely received from the search system 110. If the additional suggestions are timely received (i.e., received at a time when the suggestions are still relevant to the partial query being input, such as having prefixes matching the partial query), they can be display as suggestions. However, if the additional suggestions are not timely received (i.e., received at a time when the suggestions are no longer relevant to the partial query being input, such as having prefixes that do not match the partial query), then the suggestions can be stored in the local storage 142 for later use as possible suggestions.

In some implementations, the search engine 118 can also provide search results with additional pre-cached suggestions 144, which are based on previous related queries that users have entered. For example, the previous query can be the query that is used to identify the search results provided with the search results page. Based on this query (e.g., "new york times") that accompanies the corresponding search results (e.g., responsive to the query "new york times"), the search engine 118 provides related suggestions (e.g., "LA times", New York Post," etc.).

To identify the related suggestions, the search engine 118 can use information about past user queries from the query logs 114 and a history of user interactions with corresponding web pages from the click logs 116. The search results with additional pre-cached suggestions 144 can be stored by the browser 130 as an HTML search results page with additional suggestions based on previous queries 146.

This process of pre-caching suggestions can continue as the user keeps typing in characters of the query. By updating and caching most likely suggestions in local storage 142, the browser 130 can stay ahead of whatever the user types, even on mobile communication devices that may have a higher network latency. As a result, the cached suggestions can remain several keystrokes (e.g., two or more) ahead of the user. This can prevent displaying "stale" suggestions, or in other words, suggestions that had been based on the user's partial query two or three keystrokes ago that are no longer applicable. For example, suggestions starting with "Nebraska" that were originally cached based on the partial query "ne" (at that time) would be "stale" if the user has since entered another character (e.g., a "w" and not a "b"), resulting in the partial query "new."

The local storage 142 can store any kind of suggestion-related data that may be needed on the client device 106. For example, the local storage 142 can include HTML, HTML5, Google Gears, simple JavaScript objects, or any other cached information needed to support and display suggestions on the user's browser 130.

In some implementations, suggestions provided by the search system 110 are in the form of key value pairs, and the pre-cached suggestions stored in local storage 142 are stored as key value pairs. A key value pair can be a query input sequence (e.g., a partial query) and the query suggestions that have initial query characters that match the query input sequences. For example, one key value pair can be the input sequence "ne" and the query suggestions such as "new york," "new york city," "new york times," "Nebraska football" and so on. For example, storing pre-cached suggestions in this way can speed up the process by which the browser 130 accesses and displays suggestions based on the user's current partial query.

§2.0 Determining Initial Query Suggestions

Figure 2:
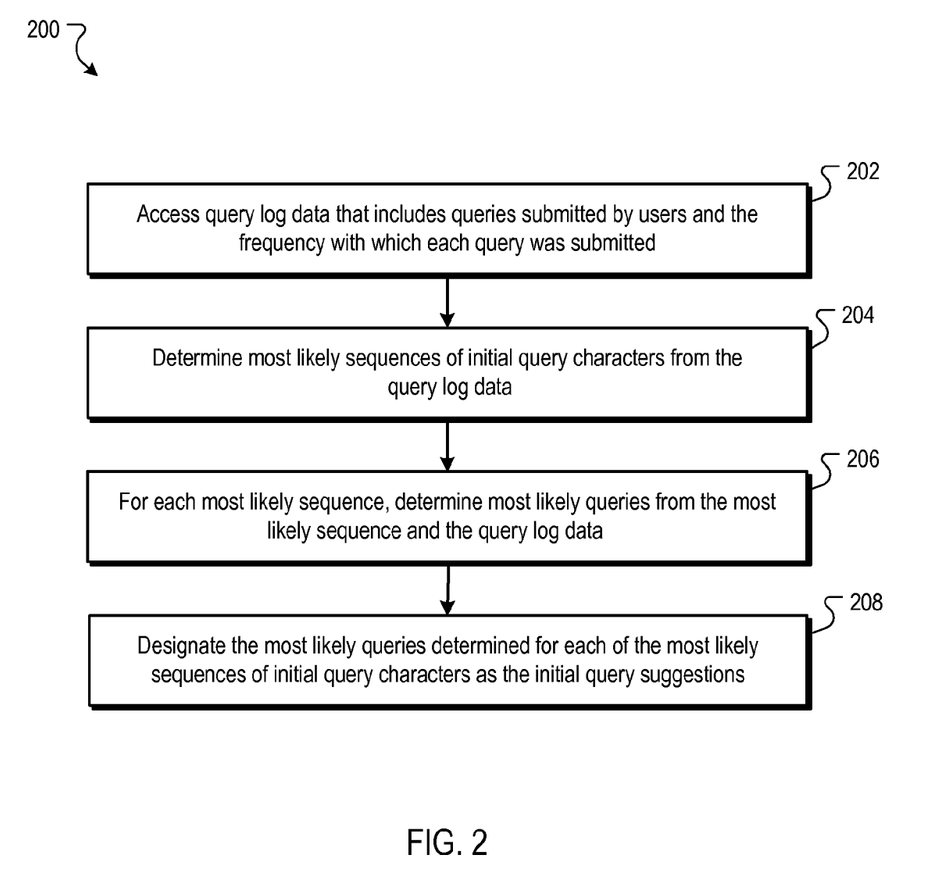
FIG. 2 is a flow diagram of an example process for determining initial query suggestions to be provided with a search interface resource.

FIG. 2 is a flow diagram of an example process 200 for determining initial query suggestions to be provided with a search interface resource. The search interface resource is a page in which a user enters a search query, such as a home page for a search engine host. The search system 110 preferably perform the steps of the process 200 prior to query time, i.e., in a back-end process separate from processing user queries input by users. Once the initial query suggestions are determined, the initial suggestions are provided with the search interface resource.

Query log data that includes queries submitted by users and the frequency with which each query was submitted are accessed (202). For example, the search system 110 can access the query logs 114. The information accessed includes specific queries that were entered previously by multiple users, the selections of search results, and the frequency at which the queries were entered.

Most likely sequences of initial query characters are determined from the query log data (204). The determination can be based on complete previous queries and their frequencies that are stored in the query logs 114. In some implementations, query frequencies that are used to determine most likely sequences are limited to a specific time period, such as the last year or the last month.

For each most likely sequence, most likely queries are determined from the most likely sequence and the query log data (206). For example, for the likely sequence of "new," the search system 110 can determine that the queries "new york times" and "new york city," each having been entered at a very high relative frequency, are the most likely queries. By comparison, the search system 110 can determine that the query "new day rising," having been previously at a relatively low frequency, is a less likely query for the sequence "new." The process is repeated for other most likely sequences (e.g., "abc," "xyz," etc.).

In some implementations, query frequency analysis can be used to determine most likely sequences and most likely queries by looking at historical queries in the user's country and language and calculating the most likely initial sequences of characters. A large cache hit ratio can be achieved for the first few characters with just a small amount of pre-cached data.

The most likely queries determined for each of the most likely sequences of initial query characters are designated as the initial query suggestions (208). As an example, the most likely queries can be used to generate the pre-cached suggestions 136 that are provided with the search page 140.

In some implementations, the most likely queries determined for each of the most likely sequences are grouped together. For example, the queries can have likelihood scores assigned to them, and the scores can be used to sequence the suggestions in descending order of likelihood. As a result, the list of suggestions provided by the search system 110 can present the most likely suggestion (e.g., "new york times") first, followed by the second most likely suggestion (e.g., "new york yankees"), and so on. In some implementations, the browser 130 displays the suggestions in order of likelihood that the suggestions are what the user intended. In other implementations, the suggestions can be displayed in other orders, such as alphabetically.

§2.1 Determining Additional Query Suggestions

The process 200 can be also used by the search system 110 for generating additional suggestions based on partial queries received from user devices. The additional suggestions are provided subsequent to the initial suggestions (e.g., with a search results page, for example). The search system 110 can use various techniques for processing the partial queries, including query frequency analysis as describe above, prefix analysis, and letter frequency analysis. Prefix analysis can examine a partial query and determine the most likely complete queries based on analyzing historical query data. This technique can predict the most likely intermediate partial queries (e.g., "new" or "new york") in order to generate suggestions that are pre-cached for those partial queries without having to make a network request for each character the user types.

Letter frequency analysis can be used to predict the most likely following letters by processing historical queries based on, for example, the final (e.g., last-entered) letter of a partial query. For example, whenever an English user types "q," it is highly likely that the following letter will be "u" even if the rest of the query is unique and does not lend itself to prefix analysis. Thus, the response for a partial query ending in "q" would also include suggestions for the same partial query followed by "u," without requiring another request that includes the letter "u."

Additionally, the search system 110 can process complete queries received from the user to provide additional query suggestions. For example, the search system 110 can use related search analysis to identify query suggestions. Related search analysis, when given a full query executed by the user, can predict other queries that the user is likely to type. The queries can be included as pre-cached suggestions for those queries in the HTML search results page so that they are available if the user types those queries without requiring a network request.

Finally, the client device can also use query histories to generate the query suggestions on the client. Query histories can be used to generate suggestions based on the likelihood that users are very likely to repeat previous queries. For example, a user's previous queries can be cached locally (e.g., in local storage 142) so they can be displayed without a network request. In some implementations, locally cached queries can include timestamps and frequencies, and queries with low frequency counts or those that have not been used recently (e.g., in the last month or year, etc.) can be purged to free up cache space.

§3.0 Providing Pre-Cached Query Suggestions

Figure 3:
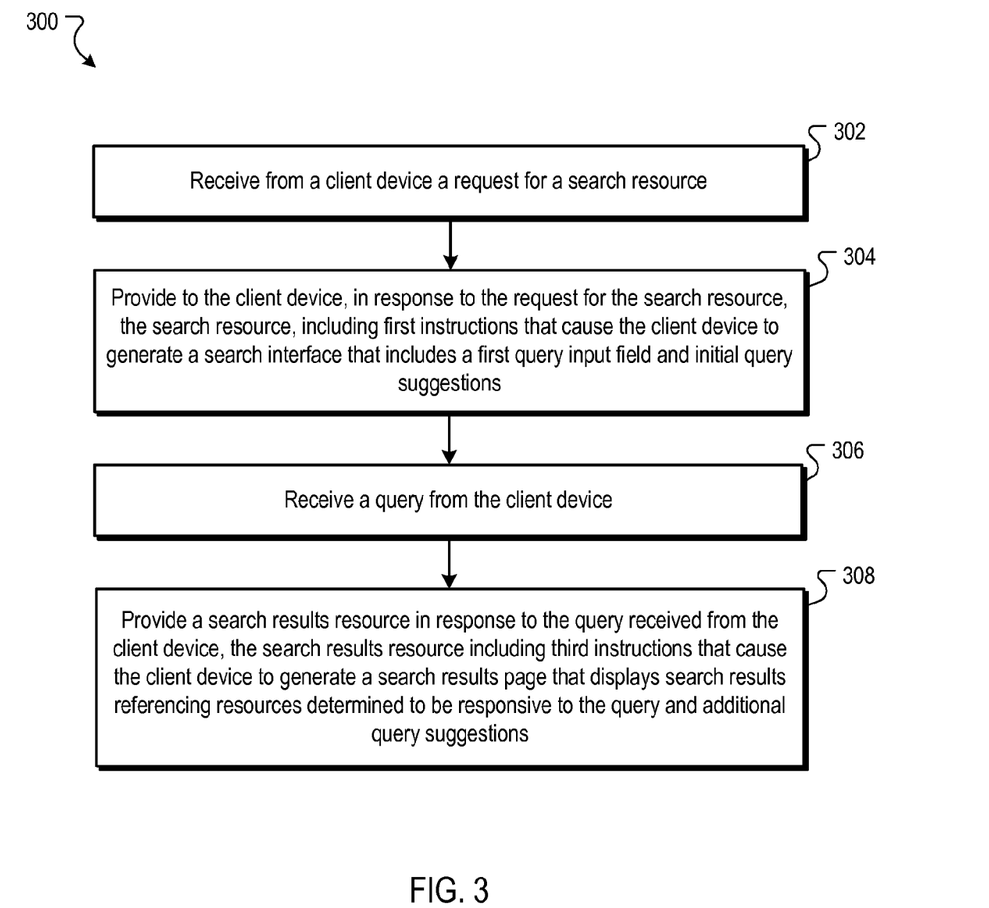
FIG. 3 is a flow diagram of an example process for providing initial query suggestions with a search engine interface resource.

FIG. 3 is a flow diagram of an example process 300 for providing initial query suggestions with a search engine interface resource. The search system 110, for example, can perform the steps of the process 300, which is a server-oriented process. The process 300 describes how the search system 110 provide the initial set of pre-cached queries to the client device, and how the search system 110 provide additional sets of pre-cached queries to the client device.

A request for a search resource is received from a client device (302). As an example, the search system 110 receives a request for a search resource page from the client device 106. The request can be sent from the user's browser 130 that is running on the client device 106, for example, as the user starts a browser application and navigates to a home page of the search system 110.

The search resource is provided to the client device in response to the request for the search resource (304). Included with the search resource are first instructions that cause the client device to generate a search interface that includes a first query input field, and initial query suggestions. As an example, the search system 110 can send the search page with pre-cached suggestions 136 to the client device 106. The search page can be in the form of HTML code that is executable on the user's browser 130. The suggestions can be the suggestions determined by the process 200, described above. The search resource also includes second instructions, such as JavaScript code, that cause the client device to store the initial query suggestions in a suggestion store on the client device.

After the search resource is rendered on the client device, and as the user enters a query, the second instructions also cause the client device to compare query characters input in a query input field to the query suggestions stored in the suggestion store, and select query suggestions that match the query characters input in the first query input field based on the comparison. The client device, executing the second instructions, then displays the selected query suggestions as query suggestions for the query characters input into the first query input field. The user may select one of the suggested queries, or may continue to enter a query. Eventually the user will enter a query (either by selecting one of the suggestions or typing in the query) and cause the client device to send the query to the search system 110.

With respect to the comparison operation, because pre-cached queries stored in the suggestion store local storage 142 are immediately available, the client device 106 does not need to request and wait on receiving additional suggestions from the search system 110. As described above, in some implementations, a request (e.g., a request for suggestions with look-ahead 134) is also sent to the suggest aggregator 127 to get additional aggregated suggestions 135 for additional partial queries based on what the user has typed so far and is most likely to type next. If the additional suggestions are timely received, they can be display as suggestions; and if the additional suggestions are not timely received, then the suggestions can be stored in the local storage 142 for later use as possible suggestions.

A query is received from the client device (306). As an example, the search system 110 can receive a query from the client device 106. The query can be a complete query that the user has either typed in or selected from the suggestions, or some combination of the two.

A search results resource is provided in response to the query received from the client device (308). The search results resource includes third instructions that cause the client device to generate a search results page that displays search results referencing resources determined to be responsive to the query, and additional query suggestions. As an example, referring to FIG. 1, the search system 110 can provide the search results resource to the client device 106 in the form of search results with additional pre-cached suggestions 144.

The search results resource includes HTML code that the client device 106 can use to display search results in the browser 130. Additionally, the search results resource can include additional query suggestions, which the search system 110 can obtain using information from the query logs 114, as described above, or from another query suggestion service. In some implementations, the additional pre-cached suggestions are based on the query that was selected and used to identify the search results for the search results resource.

The search results resource also includes fourth instructions, such as JavaScript code, that cause the client device to store the additional query suggestions in the suggestion store on the client device. As a result, the pre-cached suggestions begin to include query suggestions that are more relevant to the user's interests, and the user's browser 130 can start displaying personalized pre-cached suggestions.

After the search results resource is rendered on the client device, the user may again enter another query into a query input field on the search results resource. The fourth instructions also cause the client device to compare query characters input in a query input field to the query suggestions stored in the suggestion store, and select query suggestions that match the query characters input in the first query input field based on the comparison. The client device, executing the fourth instructions, then displays the selected query suggestions as query suggestions for the query characters input into the first query input field.

§4.0 Client Side Processing of Pre-Cached Suggestions

Figure 4:
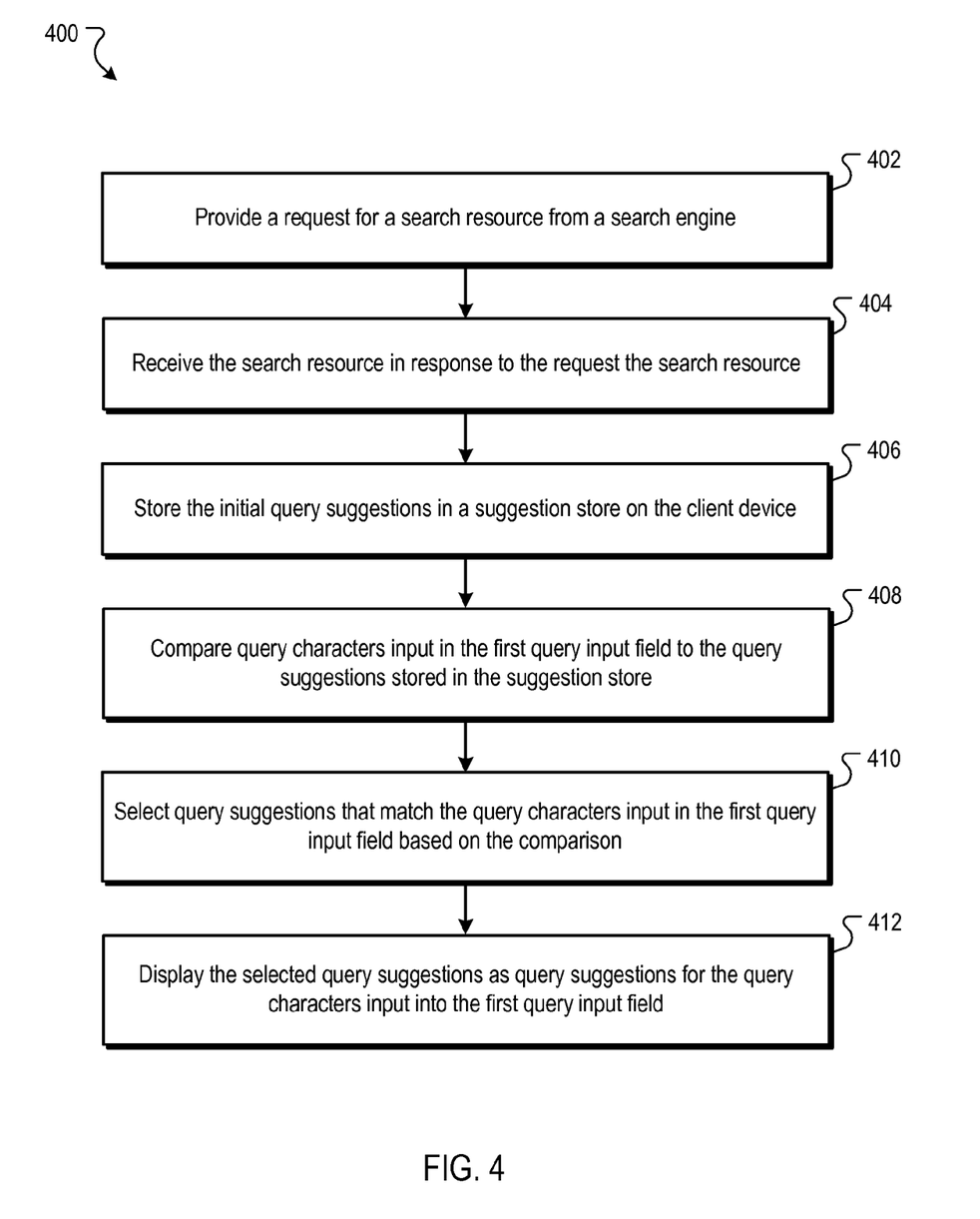
FIG. 4 is a flow diagram of an example process for receiving and requesting query suggestions from a client device.

FIG. 4 is a flow diagram of an example process 400 for receiving and requesting query suggestions from a client device. The client device 106 can perform the steps of the process 400, for example, and in interaction with the search system 110 for some of the steps.

A request is provided, the request being for a search resource from a search engine (402). As an example, the client device 106 can provide a request to the search system 110 for a search resource. The request can be sent from the user's browser 130 that is running on the client device 106, for example, as the user starts a browser application and navigates to a home page of the search system 110.

The search resource is received in response to the request the search resource (404). As an example, the client device 106 can receive the search page with pre-cached suggestions 136 from the search system 110. The search page can include instructions that enable the client device to generate a search interface that includes a query input field and initial query suggestions. The search page can be in the form of HTML code that is executable on the user's browser 130. The search page can also include second instructions, e.g., JavaScript code, that can process the pre-cached suggestions as describe above. Initial query suggestions are stored in a suggestion store on the client device (406).

For example, the client device 106, executing the second instructions, stores the initial query suggestions in the local storage 142. In this way, queries that the user is likely to select from suggestions are available and pre-cached on the client device 106.

Query characters input in the first query input field are compared to the query suggestions stored in the suggestion store (408). As an example, query characters that the user enters into the query input field are compared to the query suggestions stored in the local storage 142. For example, the user's partial query "ne" can be compared to suggestions (e.g., "new york times" and others) stored in the local storage 142.

Query suggestions that match the query characters input in the first query input field are selected based on the comparison (410). For example, the client device 106 can select query suggestions that match the query characters input in the first query input field based on the comparison. In this case, the suggestion "new york times" and other suggestions starting with "ne" are selected because they match the partial query "ne."

The selected query suggestions are displayed as query suggestions for the query characters input into the first query input field (412). The selected query suggestions can be displayed in a suggestions box that is adjacent to the first query input field. As an example, at the time at which the user has typed in "ne" in the first query input field, the user's browser 130 can also display suggestions, such as "new york times" and others that match the partial query. The browser can obtain the suggestions from local storage 142. If the user types additional characters into the query, the suggestions obtained from local storage can change to match the current partial query.

In some implementations, in addition to the local storage 142 containing query suggestions that have been recently pre-cached (e.g., based on the user's current user session and partial query), the local storage 142 can contain query suggestions that were saved, for example, based on queries recently entered into the browser, such as in a pre-determined time period (e.g., within the last month).

Although the process 400 is described in the context of receiving a search resource (e.g., a home page of the search system), the process 400 can also be applied in the context of receiving a search results page that includes additional query suggestions.

§5.0 Client Side Search Suggestion Requests to the Search System

Figure 5:
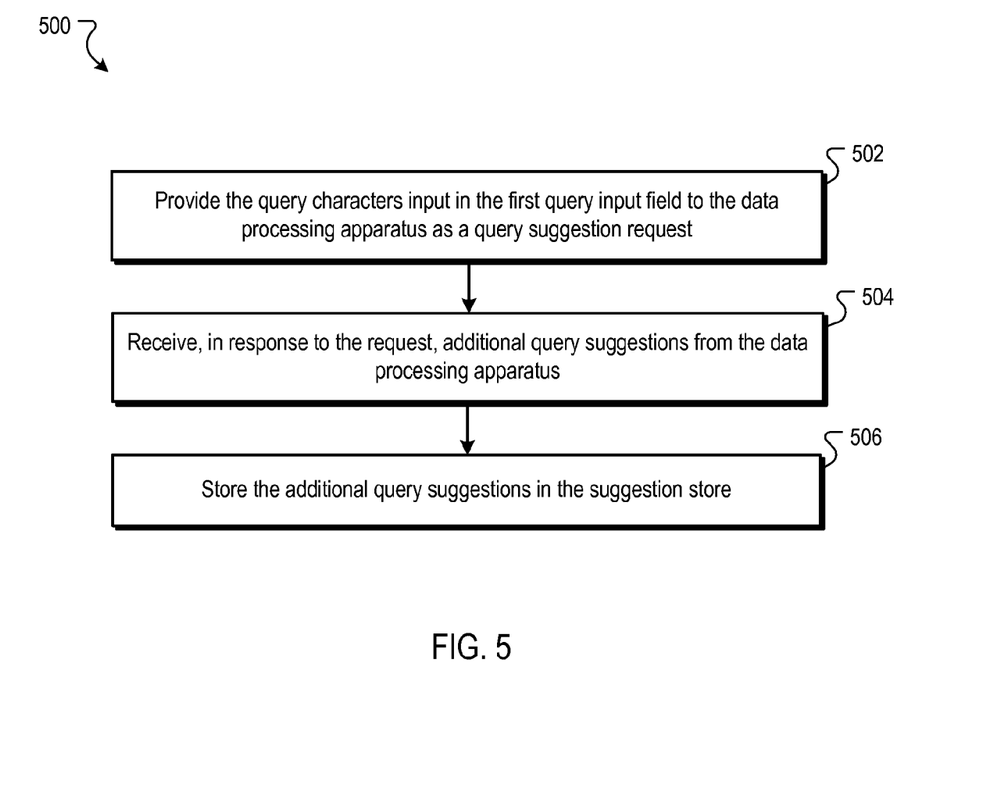
FIG. 5 is a flow diagram of an example process for providing query suggestion requests from a client device to a search engine, and processing the query suggestions received.

FIG. 5 is a flow diagram of an example process 500 for providing query suggestion requests from a client device to a search engine, and processing the query suggestions received. The client device 106, for example, can perform the steps of the process 500.

The query characters that are input in the first query input field are provided to the search system 110 as a query suggestion request (502). For example, a user can input a partial query "ne" into a query input field of a search resource or search results resource (e.g., search box on a search page or search results page). The client device 106 can send the input as a request for suggestions with look-ahead 134 to the search system 110. At the time that the request is sent, the client device 106 may already have some pre-cached suggestions stored in the local storage 142, some of which may be related to the user's current partial query, and may process these pre-cached suggestions to determine query suggestions to present to the user.

In response to the request, additional query suggestions are received from the data processing apparatus (504). For example, the client device 106 can receive the aggregated suggestions 135 from the search system 110. The suggestions received can be generated by the search system 110 using, for example, query logs 114 and click logs 116, as described above, or be received from a separate suggest service. If the additional suggestions are timely received (i.e., received at a time when the suggestions are still relevant to the partial query being input, such as having prefixes matching the partial query), they can be display as suggestions. However, if the additional suggestions are not timely received (i.e., received at a time when the suggestions are no longer relevant to the partial query being input, such as having prefixes that do not match the partial query), then the suggestions can be stored in the local storage 142 for later use as possible suggestions.

The additional query suggestions are stored in the suggestion store (506). For example, regardless of the source of the suggestions that the client device 106 receives, the suggestions can be cached in local storage 142. From that point on, the pre-cached suggestions stored in local storage 142 can be used by the browser 130 to display suggestions that match the user's current partial query. Further, the suggestions can be available on the client device 106 for later processing of query suggestions.

§6.0 Pre-Caching Location Specific Suggestions

In some implementations, the suggest aggregator 127 accounts for location data indicating the location of the client device 106, and uses the location data to provide location specific query suggestions for caching. The local storage 142, in some implementations, associates location specific query suggestions by their location, e.g., locations L1, L2 . . . Ln. The location specific query suggestions are used to augment the query suggestions provided above, which are not necessarily location specific, i.e., the location specific query suggestions are used to augment the location independent query suggestions.

For example, in some implementations, the pre-cached suggestions 136 provided with the search page, and the additional suggestions provided with the search results pages, include location independent query suggestions and location specific query suggestions. As used herein, a location independent query suggestion is a query suggestion that is eligible to be displayed as a query suggestion regardless of the location of the client device. Conversely, a location specific query suggestion is a query suggestion that is associated with a location or area and is only eligible to be displayed as a query suggestion when the client device is within that location or area.

Location specific query suggestions are generated in a similar manner as described above, except that the location specific query suggestions are specific to particular locations. For example, a process for determining an initial set of location specific query suggestions, and for determining additional location specific query suggestions, performs steps that are similar to those as described in FIG. 2, except that that queries that are processed are limited to queries received from devices within the particular location.

The relevant location information for the query suggestions is provided from location data provided by the client device, e.g., a GPS coordinate, an IP addresses that is resolved to a certain regional area, etc. For example, assume that the user of the client device lives in Mountain View, Calif. As a result, the user device will include location independent query suggestions and location specific query suggestions that are specific to the Mountain View, Calif. area (indicated by the location L1). Assume also that the user enjoys dining in barbecue restaurants, and, while in Mountain View, begins to enter the text "barbeque" as a query. As the text is being entered, query suggestions matching the entered string will be provided from location independent query suggestions and from only one location specific set of query suggestions, i.e., the query suggestions associated with the location L1. These latter query suggestions include, for example, the names of restaurants in the Mountain View, Calif. area, and other matching queries that are specific to the location of Mountain View Calif.

At a later date, the user travels to Atlanta, Ga., indicated by location L2. When the user uses the client device 106 for the first time in the Atlanta, Ga. area, the user will be provided a set of Atlanta specific initial query suggestions with the search page, and will be provided with additional Atlanta specific query suggestions with each search results page provided. Location independent query suggestions can also be provided as well. Accordingly, when the user begins into the search query "barbecue" while in Atlanta, query suggestions matching the entered string will be provided from location independent query suggestions and from only one location specific set of query suggestions, i.e., the query suggestions associated with the location L2. These latter query suggestions include, for example, the names of restaurants in the Atlanta, Ga. area, and other matching queries that are specific to the location of Atlanta, Ga.

The processing of the location specific query suggestions for display to the user can, in some implementations, be done according to a filtering process. For example, assume the request for the search resource includes location data identifying the current location of the client device 106. In addition to the location independent query suggestions, a set of initial query suggestions include location specific query suggestions that are specific to the current location of the client device are also provided. Likewise, the query suggestions that are provided with search results pages also include location specific query suggestions specific to the current location of the client device. When selecting query suggestions for display to the user, the client device, executing the instructions in the browser, excludes location specific query suggestions that are not specific to the current location of the client device. Thus, as described above, when the user is in the Atlanta, Ga. area, location specific query suggestions for Mountain View, Calif., will not be provided, as these query suggestions are not specific to the current location of Atlanta, Ga.

Other ways of filtering and providing location specific query suggestions can also be used.

§7.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous

What is claimed is:

1. A system, comprising:
a data processing apparatus; and
a memory storage apparatus in data communication with the data processing apparatus, the memory storage apparatus storing server instructions that when executed by the data processing apparatus cause the data processing apparatus to perform operations comprising:
  receiving from a client device a request for a search resource;
  providing to the client device in response to the request the search resource, the search resource including:
    first instructions that cause the client device to generate a search interface that includes a first query input field;
    initial query suggestions, wherein each initial query suggestion is determined from data separate from content of the search resource and, upon user selection from the search interface, is processed by a search service as a query, and wherein the initial query suggestions are provided to the client device with the search resource without an additional request for the initial query suggestions from the client device separate from the request;
    second instructions that cause the client device to:
      store the initial query suggestions in a suggestion store on the client device;
      compare query characters input in the first query input field to the query suggestions stored in the suggestion store;
      select query suggestions that match the query characters input in the first query input field based on the comparison; and
      display the selected query suggestions as query suggestions for the query characters input into the first query input field.

2. The system of claim 1, wherein:
the second instructions cause the client device to:
  provide the query characters input in the first query input field to the data processing apparatus as a query suggestion request;
  receive, in response to the request, additional query suggestions from the data processing apparatus; and
  store the additional query suggestions in the suggestion store; and
the server instructions cause the data processing apparatus to provide the additional query suggestions to the client device in response to the query suggestion request.

3. The system of claim 2, wherein the second instructions cause the client device to provide a separate query suggestion request for each entry of a query character into the query input field.

4. The system of claim 1, wherein:
the server instructions further cause the data processing apparatus to provide a search results resource in response to the query received from the client device, the search results resource including:
  third instructions that cause the client device to generate a search results page that displays search results referencing resources determined to be responsive to the query;
  additional query suggestions; and
  fourth instructions that cause the client device to store the additional query suggestions in the suggestion store on the client device.

5. The system of claim 4, wherein:
the search results page includes a second query input field; and
the fourth instructions cause the client device to:
  compare query characters input in the second query input field to the query suggestions stored in the suggestion store;
  select query suggestions that match the query characters input in the second query input field based on the comparison; and
  display the selected query suggestions as query suggestions for the query characters input into the second query input field.

6. The system of claim 1, wherein the server instructions, when executed by the data processing apparatus, further cause the data processing apparatus to perform operations comprising:
  accessing query log data that includes queries submitted by users and the frequency with which each query was submitted;
  determining most likely sequences of initial query characters from the query log data;
  for each most likely sequence, determining most likely queries from the most likely sequence and the query log data, each most likely query having an initial sequence of query characters matching the most likely sequence of initial query characters; and
  designating the most likely queries determined for each of the most likely sequences of initial query characters as the initial query suggestions.

7. The system of claim 6, wherein:
the second instructions cause the client device to:
  provide the query characters input in the first query input field to the data processing apparatus as a query suggestion request;
  receive, in response to the request, additional query suggestions from the data processing apparatus; and
  store the additional query suggestions in the suggestion store;
the server instructions cause the data processing apparatus to:
  receive the query characters from the client device;
  determine most likely sequences of subsequent query characters from the query log data, the subsequent query characters being query characters that are subsequent in sequence to the query characters received from the client device;

for each most likely sequence of subsequent query characters, determining most likely additional queries from the most likely sequence of subsequent query characters and the query log data, each most likely query having an initial sequence of query characters matching the query characters received from the client device and the most likely sequence of subsequent query characters;

designating the most likely additional queries determined for each of the most likely sequences of subsequent query characters as the additional query suggestions; and providing the additional query suggestions to the client device in response to the query suggestion request.

8. The system of claim 1, wherein:

the request for the search resource includes location data identifying the current location of the client device;

the initial query suggestions include location specific query suggestions that are specific to the current location of the client device; and selecting query suggestions that match the query characters input in the first query input field based on the comparison further comprises excluding location specific query suggestions that are not specific to the current location of the client device.

9. The system of claim 1, wherein the initial query suggestions are based on previous queries submitted to the search service by one or more users of the search service.

10. A system, comprising:

a data processing apparatus; and a memory storage apparatus in data communication with the data processing apparatus, the memory storage apparatus storing server instructions that when executed by the data processing apparatus cause the data processing apparatus to perform operations comprising:

accessing query log data that includes queries submitted by users and the frequency with which each query was submitted;

determining most likely sequences of initial query characters from the query log data;

for each most likely sequence, determine most likely queries from the most likely sequence and the query log data, each most likely query having an initial sequence of query characters matching the most likely sequence of initial query characters;

designate the most likely queries determined for each of the most likely sequences of initial query characters as initial query suggestions;

receive from a client device a request for a search resource;

provide to the client device in response to the request the search resource, the search resource including:

first instructions that cause the client device to generate a search interface that includes a first query input field;

the initial query suggestions;

second instructions that cause the client device to:

store the initial query suggestions in a suggestion store on the client device;

compare query characters input in the first query input field to the query suggestions stored in the suggestion store;

select query suggestions that match the query characters input in the first query input field based on the comparison;

display the selected query suggestions as query suggestions for the query characters input into the first query input field;

provide the query characters input in the first query input field to the data processing apparatus as a query suggestion request;

wherein the server instructions further cause the data processing apparatus to:

receive the query characters from the client device;

determining most likely sequences of subsequent query characters from the query log data, the subsequent query characters being query characters that are subsequent in sequence to the query characters received from the client device;

for each most likely sequence of subsequent query characters, determine most likely additional queries from the most likely sequence of subsequent query characters and the query log data, each most likely query having an initial sequence of query characters matching the query characters received from the client device and the most likely sequence of subsequent query characters;

designate the most likely additional queries determined for each of the most likely sequences of subsequent query characters as additional query suggestions; and provide the additional query suggestions to the client device in response to the query suggestion request;

wherein the second instructions cause the client device to:

receive, in response to the request, the additional query suggestions from the data processing apparatus; and store the additional query suggestions in the suggestion store; and wherein:

the server instructions cause the data processing apparatus to:

provide the initial query suggestions and additional query suggestions in the form of key value pairs, the key value pairs being pairs of query input sequences and query suggestions having initial query characters that match the query input sequences; and the second instructions cause the client device to:

provide the query characters input in the first query input field to the data processing apparatus as a query suggestion request only in response to determining that the query characters input in the first query input field do not match any of the query input sequences of the key value pairs.

11. A client device, comprising:

a processing system;

a memory storage apparatus in data communication with the processing system, the memory storage apparatus storing browser instructions that when executed by the processing system cause the client device to perform operations comprising:

providing a request for a search resource from a search service;

receiving the search resource in response to the request the search resource, the search resource including:

first instructions that cause the client device to generate a search interface that includes a first query input field;

initial query suggestions, wherein each initial query suggestion is determined from data separate from content of the search resource and, upon user selection from the search interface, is processed by the search service as a query, and wherein the initial query suggestions are received with the search resource without an additional request for the initial query suggestions to the search service separate from the request; and second instructions that cause the client device to:
store the initial query suggestions in a suggestion store on the client device;
compare query characters input in the first query input field to the query suggestions stored in the suggestion store;
select query suggestions that match the query characters input in the first query input field based on the comparison; and
display the selected query suggestions as query suggestions for the query characters input into the first query input field.

12. The client device of claim 11, wherein:
the second instructions cause the client device to:
provide the query characters input in the first query input field to the search service as a query suggestion request;
receive, in response to the request, additional query suggestions from the search service; and
store the additional query suggestions in the suggestion store.

13. The client device of claim 12, wherein the second instructions cause the client device to provide a separate query suggestion request for each entry of a query character into the query input field.

14. The client device of claim 12, wherein:
the client device receives a search results resource in response to a query received from the client device, the search results resource including:
third instructions that cause the client device to generate a search results page that displays search results referencing resources determined to be responsive to the query;
additional query suggestions; and
fourth instructions that cause the client device to store the additional query suggestions in the suggestion store on the client device.

15. The client device of claim 14, wherein:
the search results page includes a second query input field; and
the fourth instructions cause the client device to:
compare query characters input in the second query input field to the query suggestions stored in the suggestion store;
select query suggestions that match the query characters input in the second query input field based on the comparison; and
display the selected query suggestions as query suggestions for the query characters input into the second query input field.

16. The client device of claim 15, wherein:
the initial query suggestions and the additional query suggestions are provided in the form of key value pairs, the key value pairs being pairs of query input sequences and query suggestions having initial query characters that match the query input sequences; and
the second instructions and the fourth instructions cause the client device to provide the query characters input in the first query input field and second query input field, respectively, to search service as a query suggestion request only in response to determining that the query characters input in the first query input field or the second query input field, respectively, do not match any of the query input sequences of the key value pairs.

17. The client device of claim 16, wherein:
the request for the search resource includes location data identifying the current location of the client device;
the initial query suggestions include location specific query suggestions that are specific to the current location of the client device; and
selecting query suggestions that match the query characters input in the first query input field based on the comparison further comprises excluding location specific query suggestions that are not specific to the current location of the client device.

18. A computer-implemented method performed by a data processing apparatus, comprising:
receiving from a client device a request for a search resource; and
providing to the client device in response to the request for the search resource, the search resource including:
first instructions that cause the client device to generate a search interface that includes a first query input field;
initial query suggestions, wherein each initial query suggestion is determined from data separate from content of the search resource and, upon user selection from the search interface, is processed by a search service as a query, and wherein the initial query suggestions are provided to the client device with the search resource without an additional request for the initial query suggestions from the client device separate from the request; and
second instructions that cause the client device to:
store the initial query suggestions in a suggestion store on the client device;
compare query characters input in the first query input field to the query suggestions stored in the suggestion store;
select query suggestions that match the query characters input in the first query input field based on the comparison; and
display the selected query suggestions as query suggestions for the query characters input into the first query input field.

19. The method of claim 18, further comprising:
accessing query log data that includes queries submitted by users and the frequency with which each query was submitted;
determining most likely sequences of initial query characters from the query log data;
for each most likely sequence, determining most likely queries from the most likely sequence and the query log data, each most likely query having an initial sequence of query characters matching the most likely sequence of initial query characters; and
designating the most likely queries determined for each of the most likely sequences of initial query characters as the initial query characters.

20. The method of claim 19, further comprising:
receiving query characters input into the first query input field from the client device;
determining most likely sequences of subsequent query characters from the query log data, the subsequent query characters being query characters that are subsequent in sequence to the query characters received from the client device;
for each most likely sequence of subsequent query characters, determining most likely additional queries from the most likely sequence of subsequent query characters and the query log data, each most likely query having an initial sequence of query characters matching the query characters received from the client device and the most likely sequence of subsequent query characters; and designating the most likely additional queries determined for each of the most likely sequences of subsequent query characters as additional query suggestions; and providing the additional query suggestions to the client device.

21. The method of claim 20, wherein:

the initial query suggestions and additional query suggestions are in the form of key value pairs, the key value pairs being pairs of query input sequences and query suggestions having initial query characters that match the query input sequences; and the query characters input in the first query input field or second input field are provided as a query suggestion request only in response to determining that the query characters input in the first query input field or the second input field do not match any of the query input sequences of the key value pairs.

22. A non-transitory computer storage medium encoded with a computer program, the program comprising instructions that when executed by data processing apparatus cause the data processing apparatus to perform operations comprising:

receiving from a client device a request for a search resource; and providing to the client device in response to the request the search resource, the search resource including:

first instructions that cause the client device to generate a search interface that includes a first query input field;

initial query suggestions, wherein each initial query suggestion is determined from data separate from content of the search resource and, upon user selection from the search interface, is processed by a search service as a query, and wherein the initial query suggestions are provided to the client device with the search resource without an additional request for the initial query suggestions from the client device separate from the request; and second instructions that cause the client device to:

store the initial query suggestions in a suggestion store on the client device;

compare query characters input in the first query input field to the query suggestions stored in the suggestion store;

select query suggestions that match the query characters input in the first query input field based on the comparison; and display the selected query suggestions as query suggestions for the query characters input into the first query input field.

\* \* \* \* \*